(12) United States Patent
Kwon et al.

(10) Patent No.: US 9,467,898 B2
(45) Date of Patent: Oct. 11, 2016

(54) SYSTEM AND METHOD FOR RESPONSE FRAME TYPE INDICATION

(71) Applicant: FutureWei Technologies, Inc., Plano, TX (US)

(72) Inventors: Younghoon Kwon, San Diego, CA (US); Yunsong Yang, San Diego, CA (US); Zhigang Rong, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 62 days.

(21) Appl. No.: 14/040,440

(22) Filed: Sep. 27, 2013

(65) Prior Publication Data

US 2014/0092746 A1 Apr. 3, 2014

Related U.S. Application Data

(60) Provisional application No. 61/707,559, filed on Sep. 28, 2012.

(51) Int. Cl.
*H04W 28/12* (2009.01)
*H04W 74/00* (2009.01)
(Continued)

(52) U.S. Cl.
CPC .............. *H04W 28/12* (2013.01); *H04L 1/165* (2013.01); *H04L 1/1621* (2013.01);
(Continued)

(58) Field of Classification Search
CPC ..... H04W 28/12; H04W 40/00; G08C 17/02
See application file for complete search history.

(56) References Cited

U.S. PATENT DOCUMENTS

2007/0110055 A1* 5/2007 Fischer .................. H04L 47/10
370/389
2010/0014448 A1* 1/2010 Wentink ................ H04L 1/1614
370/311
(Continued)

FOREIGN PATENT DOCUMENTS

| CN | 101208895 A | 6/2008 |
| KR | 20110030698 A | 3/2011 |
| WO | 2010009046 A1 | 1/2010 |

OTHER PUBLICATIONS

Wong et al, Speed Frame Exchange, Jul. 16, 2012, IEEE 802.11-12/0834r0.*

(Continued)

*Primary Examiner* — Chi H Pham
*Assistant Examiner* — Shailendra Kumar
(74) *Attorney, Agent, or Firm* — Slater Matsil, LLP

(57) ABSTRACT

Embodiments are provided for indicating response frame types according to response frame durations in a wireless network. The embodiments include defining a plurality of response frame types in accordance to different transmission durations. The different response frame types are assigned corresponding indication values. When transmitting a current frame to a receiver entity, a transmitter entity selects a response frame type from the defined response frame types, and indicates in the current frame the selected response frame type using the assigned indication value. When a third entity receives the current frame, the third entity waits for a time period about equal to a predefined inter-frame and backoff time before transmitting a new frame. Upon determining that the indication value in the current frame is for sending a response frame, the third entity also waits an additional time period about equal to the transmission duration of the indicated response frame type.

18 Claims, 3 Drawing Sheets

(51) Int. Cl.
*H04W 52/02* (2009.01)
*H04W 84/12* (2009.01)
*H04L 1/16* (2006.01)
*H04W 74/08* (2009.01)

(52) U.S. Cl.
CPC ... *H04W 52/0216* (2013.01); *H04W 52/0238* (2013.01); *H04W 74/006* (2013.01); *H04W 84/12* (2013.01); *H04W 74/085* (2013.01)

(56) References Cited

U.S. PATENT DOCUMENTS

| | | | |
|---|---|---|---|
| 2011/0216752 A1* | 9/2011 | Trainin | H04L 1/1621 370/338 |
| 2012/0213184 A1* | 8/2012 | Choi et al. | 370/329 |
| 2015/0085775 A1* | 3/2015 | Choi | H04W 74/0808 370/329 |

OTHER PUBLICATIONS

Liu et al., Early Ack Indication, Jan. 16, 2012, IEEE 802.11-12/0119r0.*

Asterjadhi et al., ACK Indication and EIFS, May 2013, IEEE 11-13/0512r0.*
International Search Report and Written Opinion received in International Application No. PCT/CN2013/085053 mailed Jan. 16, 2014, 11 pages.
IEEE P802.11ah/D0.2, "Definitions, acronyms, and abbreviations", Aug. 2013, 351 pages.
Park, M., "IEEE P802.11 Wireless LANs Specification Framework for TGah," Intel Corporation, May 14, 2013, 76 pages.
Wong, E., "Speed Frame Exchange," [Power Point Slides] IEEE 802.11-12/0834r0, Broadcom, Jul. 2012, 17 slides.
Liu, Y., et al., "Early Ack Indication," [Power Point Slides] IEEE 802.11-12/0119r0, Marvell, Jan. 16, 2012, 7 slides.
Extended European Search Report received in European Application No. 13841364.6 dated Mar. 11, 2015, 21 pages.
Grandhi, S., "Considerations for Early NAV Indication," InterDigital Communications, IEEE 802.11-12/0615r0, May 11, 2012, slides 1-9.
Asterjadhi, A., et al., "ACK Indication and EIFS," IEEE 11-1310512r0, Qualcomm Inc. Power Point Presentation submitted May 13, 2013, slides 1-15.

* cited by examiner

SYSTEM AND METHOD FOR RESPONSE FRAME TYPE INDICATION

This application claims the benefit of U.S. Provisional Application No. 61/707,559 filed on Sep. 28, 2012 by Young Hoon Kwon, et al. and entitled "System and Method for Response Frame Type indication," which is hereby incorporated herein by reference as if reproduced in its entirety.

TECHNICAL FIELD

The present invention relates to the field of network communications, and, in particular embodiments, to a system and method for response frame type indication.

BACKGROUND

In IEEE 802.11 TGah standard for wireless local area networks (WLANs), the concept of early acknowledgement (ACK) was proposed. A two-bit response frame type indication is added in a signal (SIG) field to indicate whether an immediate response is requested by the sender after a physical layer (PHY) convergence procedure (PLCP) protocol data unit (PPDU). A station (STA), e.g., a wireless communication device, which decodes the SIG field in a received frame correctly, can determine whether to defer channel access based on this indication. The two bits of the SIG field indicate the following type of response frames from the receiver: 00 for an ACK response frame, 01 for a BA response frame, and 10 for a no ACK response frame. The indication 11 can also be used to indicate a data response frame.

SUMMARY OF THE INVENTION

In accordance with an embodiment, a method for providing response frame types according to response frame durations in a wireless network, comprising an access point (AP) and a station (STA), includes defining a plurality of response frame types in accordance to transmission durations of the response frame types. The response frame types have different transmission durations. The method further includes assigning for the response frame types a plurality of corresponding indication values, and sharing the response frame types and the corresponding indication values with one or more communication devices configured or scheduled to access a channel of the wireless network.

In accordance with another embodiment, a method implemented by a wireless network AP for response frame type indication according to response frame duration in a wireless network includes selecting a response frame type of a plurality of response frame types predefined in accordance to transmission durations of the response frame types. The response frame types have different transmission durations. The method further includes indicating, in a current frame scheduled for transmission, the selected response frame type using an indication value predefined for the selected response frame type, and transmitting the current frame on an access channel for one or more communication devices.

In accordance with another embodiment, a method for handling response frame type indication according to response frame duration in a wireless network includes detecting, by a receiver unintended to receive a current frame by a sender of the frame, an indication value in the current frame. The indication value predefined for a response frame type selected from a plurality of response frame types associated with a plurality of classes of transmission durations. The method further includes determining, by the receiver, that the current frame is intended for another entity other than the receiver. Upon determining that the indication value is for sending a response frame, the receiver waits before transmitting a new frame for a time period about equal to a transmission duration corresponding to the response frame type associated with the indication value.

In accordance with another embodiment, a communication device configured for response frame type indication according to response frame duration in a wireless network includes at least one processor and a computer readable storage medium storing programming for execution by the at least one processor. The programming includes instructions to select a response frame type of a plurality of response frame types predefined in accordance to transmission durations of the response frame types. The response frame types have different transmission durations. The programming at the communications device includes further instructions to indicate, in a current frame scheduled for transmission, the selected response frame type using an indication value predefined for the selected response frame type, and transmit the current frame on an access channel for one or more communication devices.

In accordance with yet another embodiment, a communication device configured for handling response frame type indication according to response frame duration in a wireless network includes at least one processor and a computer readable storage medium storing programming for execution by the at least one processor. The programming includes instructions to receive, in a current frame transmitted on an access channel, an indication value predefined for a response frame type selected from a plurality of response frame types belonging to a plurality of associated classes of transmission durations. The communications device is further configured to determine that the current frame is intended for another entity other than the communication device, and wait, after end of reception of the current frame, for a time period about equal to a predefined inter-frame and backoff time before contending a wireless medium for transmitting a new frame from the communication device. The programming further configures the device to, upon determining that the indication value is for sending a response frame, wait before transmitting a new frame for a time period about equal to a transmission duration corresponding to the response frame type associated with the indication value.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Current SIG field classification for response frames does not distinguish properly between different types of ACK frames allowed by IEEE 802.11 TGah, such as between normal size ACK frames and short ACK frames, or between normal size Block ACK (BA) frames and short BA frames. For example, when detecting an indication for an ACK (or BA) frame response, a third party may not be able to determine whether a normal or short ACK (or BA) frame is scheduled to follow from the receiver, and hence is not able to determine when to initiate channel access. Therefore, there is a need for an improved indication scheme for the response frame type.

Embodiments are provided herein for indicating a response frame expected by a sender following a current packet transmission in a wireless network, such as an IEEE 802.11 network or a WLAN. A set of classes is provided for indicating corresponding response frame types. Specifically, the classes are determined according to different transmission duration or length of the response frames. The set of classifications is predefined and know by the AP(s) and STA(s) of the network, e.g., prior to frame or packet transmission on an access channel. The classes are indicated in a physical layer (PHY) header part of a current transmitted frame or packet. The terms packet and frame are used here interchangeably. For instance, the indication is provided using two bits in a SIG field of the PHY header. The response frame type classification according to the duration of the response frames can resolve the current IEEE 802.11 TGah ambiguity issue in identifying short frames and normal frames. Using this indication scheme, STAs can defer the channel access right duration without ambiguity, which can improve packet collision possibility on the access channel. Further, this scheme does not add signaling overhead.

Figure 1:
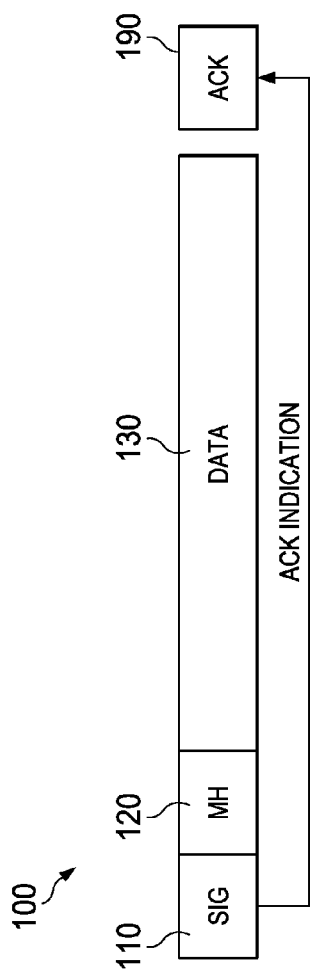
FIG. 1 illustrates an example of a frame comprising a response frame indication for WLAN access.

FIG. 1 shows an example of a frame 100 comprising a response frame indication for WLAN access. The frame 100 comprises a SIG field 110, a MAC header (MH) 120 following the SIG field 110, and a data portion 130. The SIG field 110 and the MH 120 are part of a PHY header of the frame 100. The SIG field 110 is used to indicate one of a plurality of predefined types of response frames. Thus, the type of response frame expected by the sender may be indicated in the sender's current transmission (a current frame 100). Specifically, the predefined types of response frames are classified according to their different transmission duration or length.

For instance, the predefined types include a no response type, a physical header only response type (also referred to as a null data packet (NDP) response), a normal ACK response type, and long or unspecified response type. Each of these response frame types or classes has a different transmission duration or length. The no response indication notifies the receiver that no response is requested for the current frame 100. The PHY header response indication notifies the receiver that a short packet is requested as response to the current packet or frame 100 transmission. Short packets may include short ACK frames and short BA frames. The normal ACK response indication notifies the receiver that a normal ACK frame, e.g., comprising 14-bytes payload, is requested as response to the current transmission. The long or unspecified response indication notifies the receiver that a packet or frame other than the aforementioned frame types is expected as response to the current transmission. The actual duration of this type of packet can be identified by decoding SIG field in this packet. For example, this type may include data frames. In one implementation, the four types above may be indicated using two bits in the SIG field as follows: 00 (equivalent to 0 in decimal value) for the no response type, 01 (equivalent to 1 in decimal value) for the PHY header or NDP response type, 10 (equivalent to 2 in decimal value) for the normal ACK response type, and 11 (equivalent to 3 in decimal value) for the long or unspecified response type.

In other embodiments, any suitable number of classified response frame types may be predefined according to different duration times or lengths of the response frames. For example, five instead of four types can be predefined, including no response, PHY header (or NDP) response type, normal ACK response type, data response frame type, and long or unspecified response type. In yet another embodiment, the predefined response types include no response, short response frame (including short ACK and short BA), normal size response frame (including normal ACK and normal BA), data response frame, and long or unspecified type response.

Figure 2:
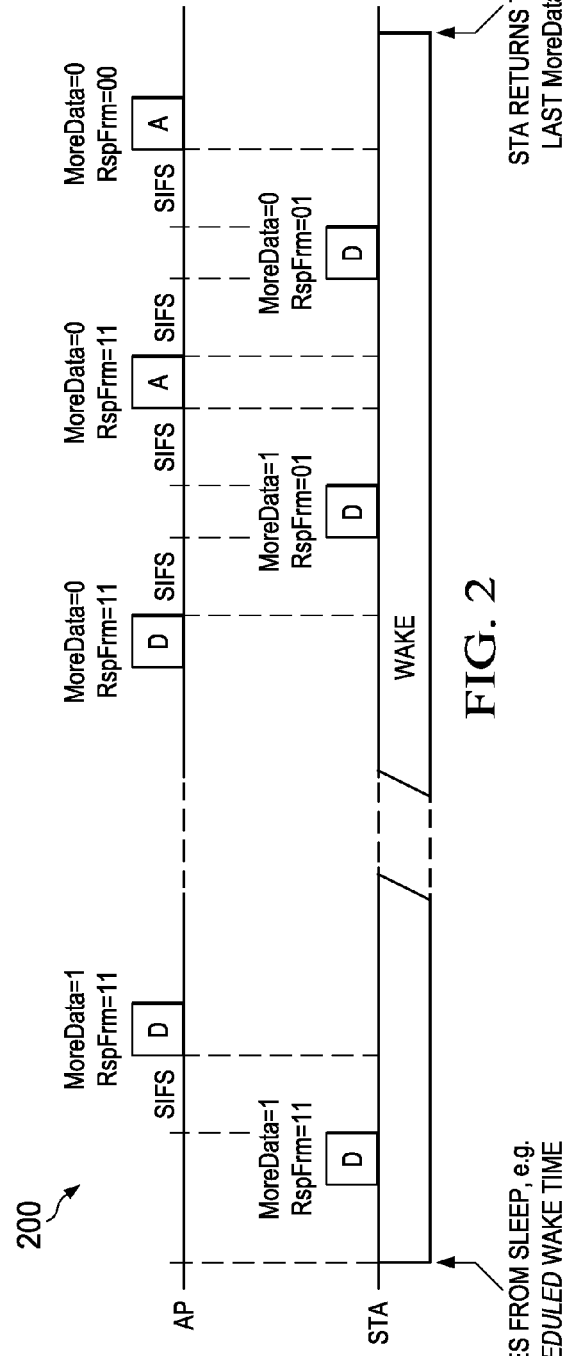
FIG. 2 illustrates an embodiment scheme for response frame type indication between an access point (AP) and a station (STA).

FIG. 2 illustrates an embodiment scheme 200 for response frame type indication between an AP and a STA in a wireless network, e.g., an 802.11 TGah network, a WLAN, or a WiFi network. The AP may be a wireless modem or router that allows one or more STAs channel access, for example over a shared channel. The STA may be user or mobile device that accesses the channel wirelessly to send (on uplink) and/or receive (on downlink) packets from the wireless network via the AP. Each downlink/uplink packet may include the frame 100 or a PHY header part (e.g., a SIG field 110) of a frame or packet indicating a response frame type according to a classification based on the actual duration of the response frame. The classification may include a no response type (e.g., indicated by bits 00), a PHY header (or NDP) response type (e.g., indicated by bits 01), a normal ACK response type (e.g., indicated by bits 10), and long or unspecified response type (e.g., indicated by bits 11), as described above. Additionally, the packet may include a "more data" field that can be set (e.g., to 1) to indicate by sender a subsequent data packet scheduled for transmission, or set to (e.g., to 0) to indicate by sender that no subsequent data packet is scheduled for transmission.

Figure 3:
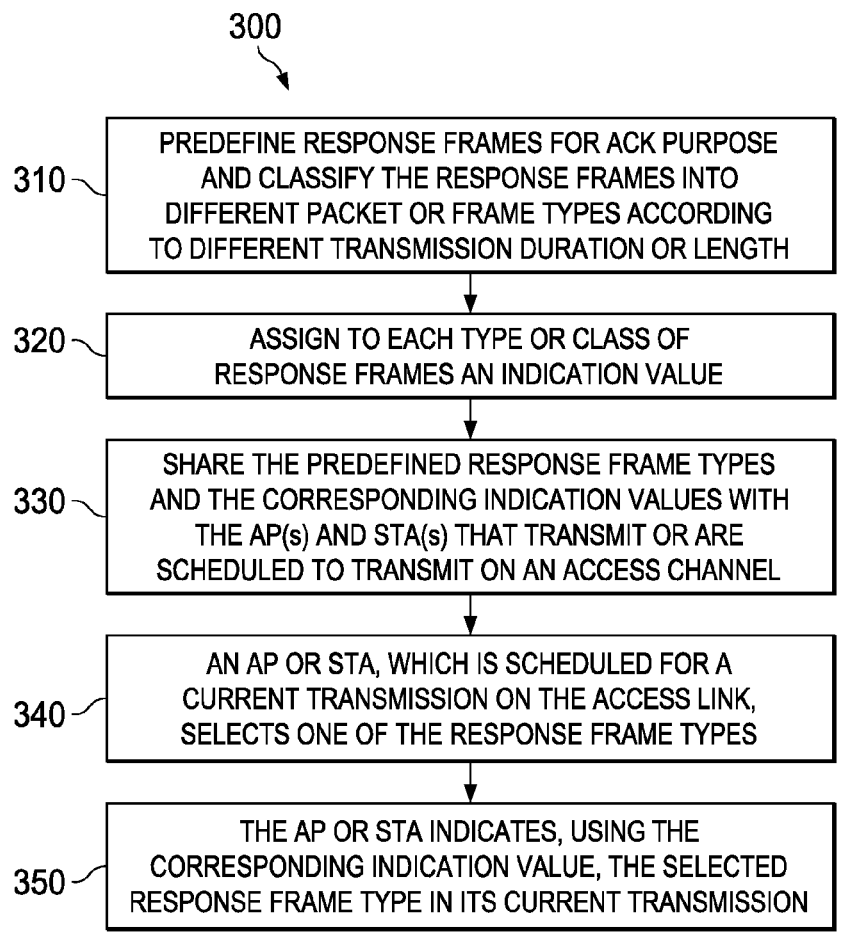
FIG. 3 illustrates an embodiment method for response frame type indication for IEEE 802.11 or WLAN access.
Figure 4:
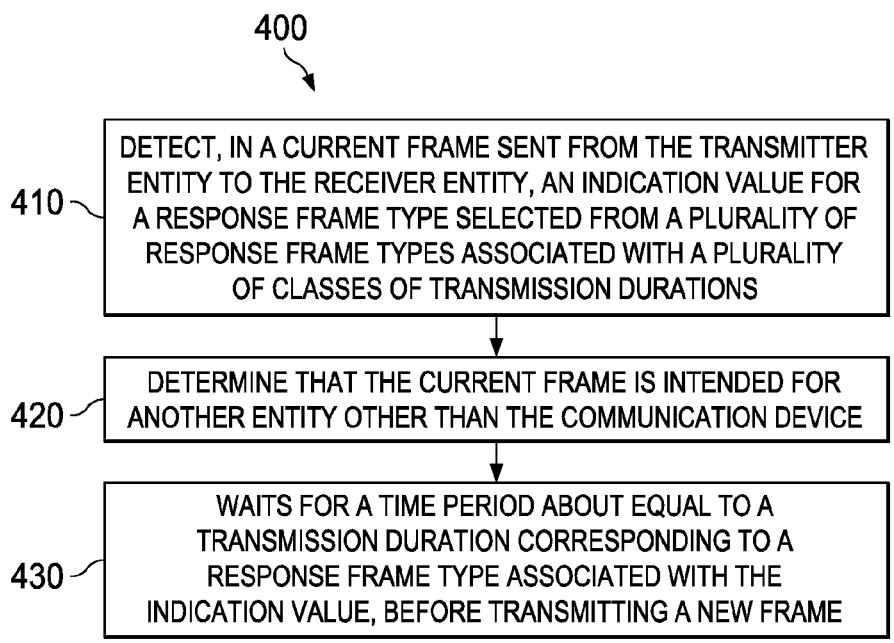
FIG. 4 illustrates an embodiment method for detecting response frame type indication for IEEE 802.11 or WLAN access.

FIG. 3 illustrates an embodiment method 300 for response frame type indication for wireless network access, e.g., in an IEEE 802.11 network, a WLAN, or a WiFi network. At step 310, response frames for ACK purpose are predefined and classified into different packet or frame types according to different transmission duration or length. At steps 320, each type or class is assigned an indication value. For example, a total of four response frame types or classes are assigned four corresponding values using a total of two bits, as described above. At step 330, the predefined response frame types and the corresponding indication values are shared with the AP(s) and STA(s) that transmit or are scheduled to transmit on an access channel. At step 340, an AP or STA, which is scheduled for a current transmission on the access link, selects one of the response frame types. At step 350, the AP or STA indicates, using the corresponding indication value, the selected response frame type in its current transmission. For instance, the selected response frame is indicated in a SIG field or a PHY header part of a currently transmitted frame or packet. FIG. 4 illustrates an embodiment method 400 for detecting response frame type indication for wireless network access, e.g., in an IEEE 802.11 network, a WLAN, or a WiFi network. The method 400 is implemented by a third entity (e.g., STA, or AP that is not the AP transmitting the frame) other than a transmitter entity (e.g., AP) of a frame and a receiver entity (e.g., a second STA) intended for receiving the frame. At step 410, the third entity detects, in a current frame sent from the transmitter entity to the receiver entity, an indication value for a response frame type selected from a plurality of response frame types associated with a plurality of classes of transmission durations, as described above. At step 420, the third entity determines that the current frame is intended for another entity other than the communication device. The third entity waits, at step 430, for a time period about equal to a transmission duration corresponding to a response frame type associated with the indication value, before transmitting a new frame. Specifically, the third entity waits, after the end of reception of the current frame, for a time period about equal to a predefined inter-frame and backoff time before contending a wireless medium for transmitting a new frame from the third entity. Upon determining that the indication value is for sending a response frame (not for a no response frame type), the third entity further waits, before contending the wireless medium for transmitting the new frame, an additional time period about equal to another transmission duration corresponding to the response frame type associated with the indication value. In another embodiment, a similar method is implemented by the intended receiver, in which, the receiver may use the indication value for a response frame type in the received frame to make sure what specific response it needs to send by decoding the SIG field or a PHY header, and/or may use this indication value to estimate the reaction or activities of a third part entity after the third party receives the frame carrying the indication value.

For example, if the indicated response frame type is the PHY header (or NDP) response type (e.g., the indication value is 01 bits), then the third entity waits for a time corresponding to about a length of the PHY header response type and a predefined inter-frame/backoff time before contending wireless medium for transmitting a new frame. If the response frame type is the normal ACK size response type or the normal BA size response type (e.g., the indication value is set to 10 bits), then the third entity waits for a time corresponding to about a length of the normal ACK size response type or the normal BA size response type and a predefined inter-frame/backoff time before contending wireless medium for transmitting a new frame. In the case the same indication value is used for both the normal ACK size response type or the normal BA size response type (e.g., 10 bits), the third party can also detect information or a second indication value in the current frame to determine whether the indicated response frame type is the normal ACK size response type or the normal BA size response type. Alternatively, if the response frame type is the long or unspecified response type (e.g., the indication value is 11 bits), then the third entity waits for a defined extended time, e.g., the maximum allowed packet duration and required backoff time. If the indicated response frame type is the no response type (e.g., the indication value is 00 bits), then the third entity waits predefined inter-frame/backoff time only before contending wireless medium for transmitting a new frame.

Figure 5:
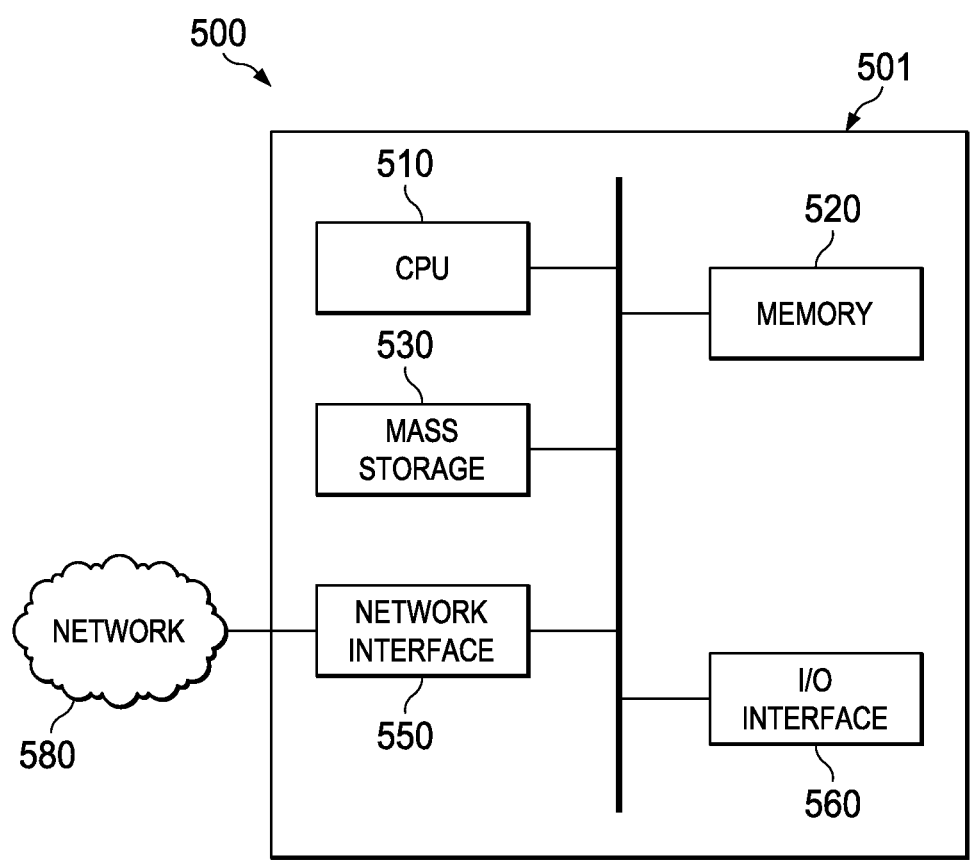
FIG. 5 is a diagram of a processing system that can be used to implement various embodiments.

FIG. 5 is a block diagram of an exemplary processing system 500 that can be used to implement various embodiments. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 500 may comprise a processing unit 501 equipped with one or more input/output devices, such as a network interfaces, storage interfaces, and the like. The processing unit 501 may include a central processing unit (CPU) 510, a memory 520, a mass storage device 530, and an I/O interface 560 connected to a bus. The bus may be one or more of any type of several bus architectures including a memory bus or memory controller, a peripheral bus or the like.

The CPU 510 may comprise any type of electronic data processor. The memory 520 may comprise any type of system memory such as static random access memory (SRAM), dynamic random access memory (DRAM), synchronous DRAM (SDRAM), read-only memory (ROM), a combination thereof, or the like. In an embodiment, the memory 520 may include ROM for use at boot-up, and DRAM for program and data storage for use while executing programs. In embodiments, the memory 520 is non-transitory. The mass storage device 530 may comprise any type of storage device configured to store data, programs, and other information and to make the data, programs, and other information accessible via the bus. The mass storage device 530 may comprise, for example, one or more of a solid state drive, hard disk drive, a magnetic disk drive, an optical disk drive, or the like.

The processing unit 501 also includes one or more network interfaces 550, which may comprise wired links, such as an Ethernet cable or the like, and/or wireless links to access nodes or one or more networks 580. The network interface 550 allows the processing unit 501 to communicate with remote units via the networks 580. For example, the network interface 550 may provide wireless communication via one or more transmitters/transmit antennas and one or more receivers/receive antennas. In an embodiment, the processing unit 501 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method in a wireless network, the method comprising:
   identifying response indications each of which associated with a different response frame duration; and
   inserting one of the response indications into a signal (SIG) field of a frame to indicate a duration of a response following the frame, the response indication in the SIG field indicating that no immediate response follows the frame when the response indication is set to 00, that a null data packet (NDP) response follows the frame when the response indication is set to 01, that a normal duration response follows the frame when the response indication is set to 10, and that a long duration response follows the frame when the response indication is set to 11, wherein the NDP response is a frame that includes a physical header and excludes a payload.

2. A method comprising:
   inserting, in a signal (SIG) field of a frame scheduled for transmission, one of a plurality of response indication values, each of the plurality of response indication values being associated with a different response frame duration; and
   transmitting the frame on an access channel for one or more communication devices, the response indication value in the SIG field indicating that no immediate response follows the frame when the response indication value is set to 00, that a null data packet (NDP) response follows the frame when the response indication value is set to 01, that a normal duration response follows the frame when the response indication value is set to 10, and that a long duration response follows the frame when the response indication value is set to 11, wherein the NDP response is a frame that includes a physical header and excludes a payload.

3. The method of claim 2, wherein the transmitted frame comprises a physical layer (PHY) header portion including the response indication value.

4. A method comprising:
   detecting, by a receiver unintended to receive a frame by a sender of the frame, a duration of a response following the frame based on a response indication value in a signal (SIG) field of the frame communicated over a channel, the receiver detecting that no immediate response follows the frame when the response indication value is set to 00, that a null data packet (NDP) response follows the frame when the response indication value is set to 01, that a normal duration response follows the frame when the response indication value is set to 10, and that a long duration response follows the frame when the response indication value is set to 11, wherein the NDP response is a frame that includes a physical header and excludes a payload;
   determining that the frame is intended for another entity other than the receiver; and
   waiting before transmitting a new frame in the channel for a time period corresponding to a transmission duration corresponding to the response indication value.

5. The method of claim 4, wherein when the response indication value in the SIG field indicates that no immediate response follows the frame, the receiver waits, after the end of reception of the frame, for a time corresponding to a predefined inter-frame and backoff time before transmitting the new frame in the channel.

6. The method of claim 4, wherein when the response indication value in the SIG field indicates that the NDP response follows the frame, the receiver waits, after the end of reception of the frame, for a time corresponding to a length of the NDP response and a predefined inter-frame and backoff time before transmitting the new frame in the channel.

7. The method of claim 4, wherein when the response indication value in the SIG field indicates that the normal duration response follows the frame, the receiver waits, after the end of reception of the frame, for a time corresponding to a length of the normal duration response and a predefined inter-frame and backoff time before transmitting the new frame in the channel.

8. The method of claim 7 further comprising detecting information of a second indication value in the frame to determine whether the normal duration response is a normal ACK size response or a normal BA size response.

9. The method of claim 4, wherein when the response indication value in the SIG field indicates that the long duration response follows the frame, the receiver waits, after the end of reception of the frame, for a defined extended time and a predefined inter-frame and backoff time before transmitting the new frame in the channel.

10. A communication device in a wireless network, the communication device comprising:
    at least one processor; and
    a computer readable storage medium storing programming for execution by the at least one processor, the programming including instructions to:
        insert, in a signal (SIG) field of a frame scheduled for transmission one of a plurality of response indication values, each of the plurality of response indication values being associated with a different response frame duration; and
        transmit the frame on an access channel for one or more communication devices, the response indication value in the SIG field being set to 00 to indicate that no immediate response follows the frame, set to 01 to indicate that a null data packet (NDP) response follows the frame, set to 10 to indicate that a normal duration response follows the frame, or set to 11 to indicate that a long duration response follows the frame, wherein the NDP response is a frame that includes a physical header and excludes a payload.

11. The communication device of claim 10, wherein the communication device is an access point (AP) or a station (STA), and wherein the one or more communication devices include at least one of a second AP or a second STA.

12. A communication device in a wireless network, the communication device comprising:
  at least one processor; and
  a computer readable storage medium storing programming for execution by the at least one processor, the programming including instructions to:
    detect a duration of a response following a frame based on a response indication value in a signal (SIG) field of the frame transmitted on an access channel, the communications devices detecting that no immediate response follows the frame when the response indication value is set to 00, that a null data packet (NDP) response follows the frame when the response indication value is set to 01, that a normal duration response follows the frame when the response indication value is set to 10, and that a long duration response follows the frame when the response indication value is set to 00, wherein the NDP response is a frame that includes a physical header and excludes a payload;
    determine that the frame is intended for another entity other than the communication device; and
    wait before transmitting a new frame in the access channel for a time period corresponding to a transmission duration corresponding to the response indication value.

13. The communication device of claim 12, wherein the instructions to wait before transmitting a new frame in the access channel includes further instructions to, when the response indication value in the SIG field indicates that no immediate response follows the frame, wait until after the end of reception of the frame for a time corresponding to a predefined inter-frame and backoff time before transmitting the new frame in the access channel.

14. The communication device of claim 12, wherein the instructions to wait before transmitting a new frame in the access channel includes further instructions to, when the response indication value in the SIG field indicates that the NDP response follows the frame, wait until after the end of reception of the frame for a time corresponding to a length of the NDP response and a predefined inter-frame and backoff time before transmitting the new frame in the access channel.

15. The communication device of claim 12, wherein the instructions to wait before transmitting a new frame in the access channel includes further instructions to, when the response indication value in the SIG field indicates that the normal duration response follows the frame, wait until after the end of reception of the frame, for a time corresponding to a length of the normal duration response and a predefined inter-frame and backoff time before transmitting the new frame in the access channel.

16. The communication device of claim 12, wherein the instructions to wait before transmitting a new frame in the access channel includes further instructions to, when the response indication value in the SIG field indicates that the long duration response follows the frame, wait until after the end of reception of the frame for a defined extended time and a predefined inter-frame and backoff time before transmitting the new frame in the access channel.

17. The communication device of claim 12, wherein the communication device is an access point (AP) or a station (STA) that is a target for the frame.

18. The method of claim 1, further comprising transmitting the frame in a channel.

* * * * *